United States Patent [19]

Halvis et al.

[11] Patent Number: 4,812,801
[45] Date of Patent: Mar. 14, 1989

[54] SOLID STATE GAS PRESSURE SENSOR

[75] Inventors: James Halvis, Arnold; Nathan Bluzer, Silver Spring; Robert Shiskowski, Columbia, all of Md.

[73] Assignee: The United States of America as represented by the Secretary of the Air Force, Washington, D.C.

[21] Appl. No.: 49,363

[22] Filed: May 14, 1987

[51] Int. Cl.$^4$ ............................................. G01L 1/22
[52] U.S. Cl. .................................... 338/4; 338/36
[58] Field of Search .................. 338/3, 4, 5, 36, 42; 73/708

[56] References Cited

U.S. PATENT DOCUMENTS

| | | | |
|---|---|---|---|
| 3,406,572 | 10/1968 | Robillard | 73/398 |
| 3,513,430 | 5/1970 | Heller | 338/4 |
| 4,019,388 | 4/1977 | Hall, II et al. | 73/398 AR |
| 4,314,225 | 2/1982 | Tominaga et al. | 338/4 |
| 4,430,899 | 2/1984 | Wessel | 73/754 |
| 4,459,856 | 7/1984 | Ko et al. | 73/754 |
| 4,558,238 | 12/1985 | Yamada et al. | 338/3 X |

FOREIGN PATENT DOCUMENTS

| | | | |
|---|---|---|---|
| 59-132327 | 7/1984 | Japan | 338/34 |
| 60-174844 | 9/1985 | Japan | 338/34 |

OTHER PUBLICATIONS

Fink and Christianson, "Transducers for Fluid-Mechanical Quantities", *Electronics Engineers' Handbook*, McGraw-Hill, NY, 1982, pp. 10–29 et al.

*Primary Examiner*—E. A. Goldberg
*Assistant Examiner*—M. M. Lateef
*Attorney, Agent, or Firm*—Stanton E. Collier; Donald J. Singer

[57] ABSTRACT

A solid state gas pressure sensor has a resistor of polysilicon deposited upon a dielectric substrate which electrically isolates and thermally prevents heat transfer to other devices thereon. A constant voltage is applied to the resistor. Depending upon the gas pressure over the sensor, a given current will be output once temperature equilibrium is established. A change in the gas pressure changes the output current of the resistor. The output current indicative of pressure is temperature corrected.

2 Claims, 1 Drawing Sheet

SOLID STATE GAS PRESSURE SENSOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to pressure sensors, and more, particularly, to thermoconductive vacuum pressure sensors.

Thermoconductive vacuum transducers (sensors) measure pressure by monitoring the temperature of a heated wire filament in the transducer as heat is transferred to the surrounding gas and case, in particular. The heat transferred and therefore the temperature of the filament will vary proportionally to the amount of gas pressure about the filament since the gas density is directly proportional to the pressure. The heated gas typically transfers the heat to the transducer wall or case. Two types of such transducers are the Pirani gage and the thermocouple gage which may have a thermopile therein. These transducers are physically large as compared to IC circuits and are thus not suited to uses where space is limited and other factors limit their application.

It is known to convert pressure signals into electrical signals by utilizing the piezoresistive effect of a semiconductor crystal. A conventional pressure sensor as a typical embodiment of this method has a silicon plate or block a portion of which takes the form of a diaphragm and a diffused resistor formed in a surface region of the silicon diaphragm. When there is a difference between the pressures on the two sides of the silicon diaphragm, the resistance of the diffused resistor varies proportionally to the magnitude of the pressure difference or to the resultant stress on the silicon diaphragm. It is clear that this apparatus has size limitations since one must have a moving diaphragm that is electrically isolated with the resistor therein.

Other types of pressure transducers are based upon changes in capacity of a flexing membrane.

The present invention is directed toward providing a solid state gas sensor having none of the above limitations.

SUMMARY OF THE INVENTION

The present inventor provides a solid state gas pressure sensor.

A polysilicon resistor is fabricated by integrated circuit techniques on an electrically insulated substrate such as a silicon substrate upon which other electronic devices can also be fabricated.

The side of the substrate opposite the resistor is preferably thermally insulated so that heat generated by the resistor is conducted into the surrounding gas. The resistor is connected into an appropriate electronic circuit so that changes in current and temperature are monitored to arrive at the gas pressure of the gas surrounding the resistor.

When current initially passes through the resistor it will begin heating until thermal equilibrium is reached when the heat generated equals the heat dissipated. Part of the heat dissipates through the substrate and part to the gas thereabove. If the resistor is well insulated from the substrate a larger portion of the heat will be dissipated to the gas thereabove and thus increases the ability to measure that gas pressure.

As the temperature of a semiconductor increases the mobility and quantity of carriers increases; therefore, the resistance of a polysilicon resistor will decrease as the temperature increases.

As the gas pressure is decreased there is less gas above the resistor sensor to dissipate heat and the temperature of the resistor will increase, decreasing the resistance until equilibrium is again reached. With a constant voltage source the change in current can be calibrated to a change in pressure. By also using a temperature compensating circuit (on chip) differences in ambient temperature can be compensated for in determining the correct absolute gas pressure. Clearly the temperature compensating circuit sensor would not be located next to the resistor because of the heat generated would interfere with the ambient gas temperature.

It is therefore one object of the present invention to provide a solid state gas pressure sensor; and It is another object of the present invention to provide a gas pressure sensor that may be fabricated upon a semiconductor substrate by integrated circuit techniques.

These and many other objects and advantages of the present invention will be readily apparent to one skilled in the pertinent art from the following detailed description of a preferred embodiment of the invention and the related drawings.

DETAILED DESCRIPTION OF THE PREFERRED EMBODIMENT

Figure 1:
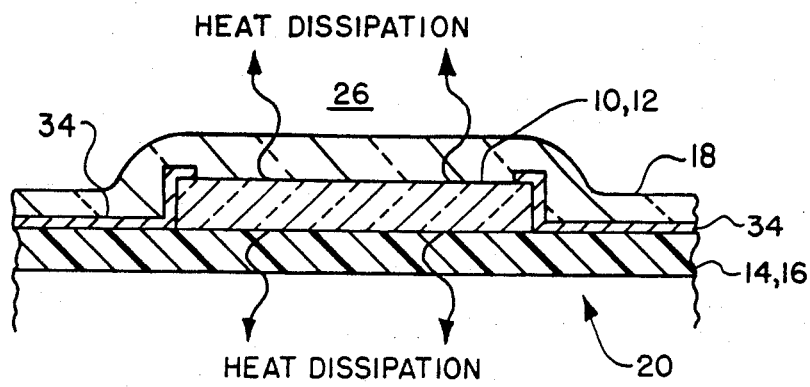
FIG. 1 illustrates by schematic the apparatus of the present invention.

Referring to FIG. 1, a layer 10 of polysilicon formed to be a resistor 12 is deposited by conventional integrated circuit techniques upon a layer 14 of a dielectric material, for example, silicon. Layer 14 may be a conventional semiconductor substrate 16 which is an electrical insulator and preferably an insulator of heat also such that any heat from resistor 12 is radiated in the upper direction away from substrate 16. Electrical contacts 34 to resistor 12 are metal strips upon which electrical leads, not shown, may be connected. A protective layer 18 of glass silicon dioxide may also be deposited upon resistor 12 and substrate 16 to prevent adverse chemical reactions if the gas thereabout is corrosive.

Figure 2:
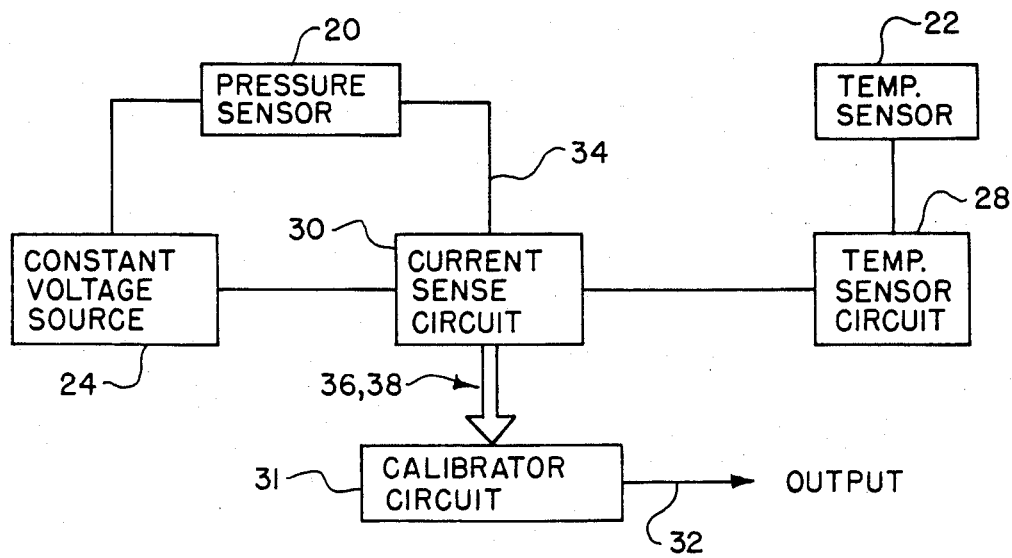
FIG. 2 illustrates by block flow diagram a circuit for the present invention.

FIG. 1 is a partial cross section of a gas pressure sensor 20 and it is to be understood that this sensor 20 may be placed on an integrated circuit with other devices as need be. For example, FIG. 2 illustrates a block flow diagram of the electronic circuit used to output pressure data. As seen therein a temperature sensor 22 may be colocated with sensor 20 on the same chip so that correction may be made for different gas temperatures about sensor 20 Temperature sensor 22 and pressure sensor 20 are placed on the chip so that the heat from resistor 12 does not influence sensor 22 as sensor 22 is to measure the ambient gas temperature.

When a constant voltage is applied to pressure sensor 20 by a constant voltage source 24, a current passes through resistor 12 and causes resistor 12 to heat up until a thermal equilibrium is reached. The heat generated is transferred to protective layer 18, substrate 16, to a surrounding gas 26, and to other objects connected therewith. It is preferable that as much heat as possible flows to gas 26 since a change in pressure, i.e., a change in gas density, alters the electrical characteristics of resistor 12 to a greater degree.

As the temperature of a semiconductor increases the mobility and quantity of carriers increases. Therefore, the resistance of a polysilicon resistor will decrease as the temperature increases. It is well known that the resistance of a material is inversely proportional to the conductivity of the material. Conductivity is proportional to mobility and the mobility of carriers for impurity scattering is proportional to temperature (in Kelvin) to a three halfs power.

If there is a change in the pressure, a decrease for example, there is less gas 26 above resistor 12 to dissipate the heat and thus the temperature of the resistor 12 will increase, decreasing the resistance until equilibrium is again reached.

Again, referring to FIG. 2, as the gas pressure changes, pressure sensor 20 will output a different pressure current 34. A pressure signal 36 reflective of the pressure current 34 will be output to a calibration circuit 31. Depending on the temperature sensed by temperature sensor 22, temperature sensor circuit 28 will also cause current sensing circuit 30 to output a temperature signal 38 reflective of this temperature current. Calibration circuit 31 may have therein an analog-to-digital convertor for changing the analog input signals to digitized signals that would be applied to a look-up table/ROM and the resultant output signal 32 would be output for further processing.

Figure 3:
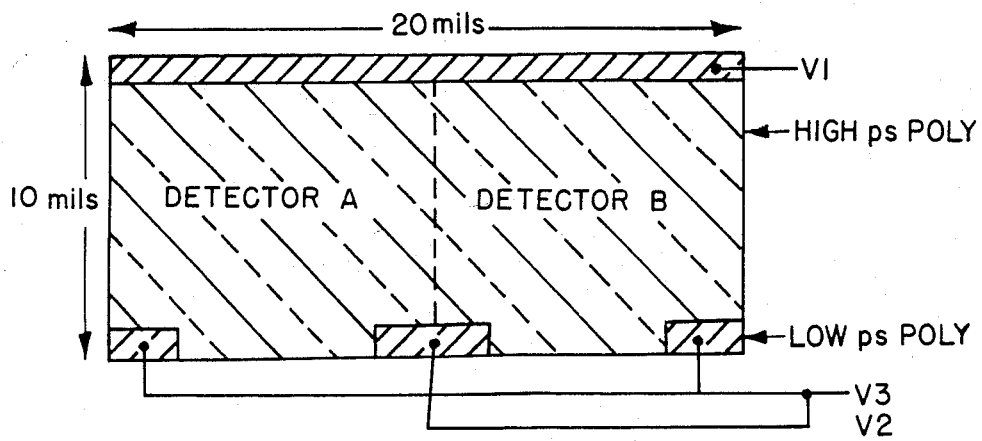
FIG. 3 illustrates by cross section an apparatus used to test the present invention.

The operability of pressure sensor 20 using a resistor 12 was determined by using a 5090 peristaltic CCD test sensor having a resistive gate detector. A sheet resistance of about 2K-OHMS/SQ was obtained using the detector as resistor 12 by shorting V2 to V3, see FIG. 3. The detectors were placed in a vacuum chamber and a constant voltage source 24 was connected across V1 and V2/3. Current readings were taken as the chamber was evacuated. Table I summarizes the results. With the constant voltage source, the resistor 12 was calibrated to determine chamber pressure. Current readings were accurate to only 5 mA and pressures above 10 m Torr could not be read from the available vacuum gage.

TABLE I

| PRESSURE | VOLTAGE ACROSS V1-V2/3 | CURRENT | RESISTANCE | POWER DISSIPATION |
| --- | --- | --- | --- | --- |
| ATM | 20 V | 18.5 mA | 1081 ohms | 1.85 mW/mil |
| AFTER 3 MIN VENTURI | | 19.0 | 1053 | |
| 10 mTorr | | 20.0 | 1000 | |
| 8 | | 20.5 | 976 | |
| 6 | | 21.0 | 952 | |
| 4 | | 21.0 | 952 | |
| 2 | | 21.5 | 930 | |
| ATM | | 18.5 | 1081 | |
| ATM | 30 V | 30.5 mA | 984 ohms | 4.6 mW/mil |
| AFTER 3 MIN VENTURI | | 31.0 | 968 | |
| 10 mTorr | | 35.0 | 857 | |
| 8 | | 35.5 | 845 | |
| 6 | | 35.5 | 845 | |
| 4 | | 35.5 | 845 | |
| 2 | | 36.0 | 833 | |
| ATM | | 30.5 | 984 | |
| ATM | 40 V | 44.0 mA | 909 ohms | 8.8 mW/mil |
| AFTER 3 MIN VENTURI | | 44.5 | 899 | |
| 10 mTorr | | 49.0 | 816 | |
| 8 | | 49.0 | 816 | |
| 6 | | 49.0 | 816 | |
| 4 | | 49.5 | 808 | |
| 2 | | 49.5 | 808 | |
| ATM | | 44.0 | 909 | |

The above gas pressure sensor 12 may be part of a monolithic integrated circuit wherein the necessary electronic circuit may be placed. Sensor 12 is small in size as compared to prior sensors and is very inexpensive since it would be a part of an IC fabrication process. Because of the thermal isolation the sensor 12 would be more efficient than prior devices where the heat is transferred to the sensor case.

These and many other objects and advantages of the present invention will be readily apparent to one skilled in the pertinent art from the following detailed description of a preferred embodiment of the invention and the related drawings.

We claim:

1. A solid state gas pressure sensor, said gas pressure sensor comprising:
    a means for producing heat in response to current flow at a fixed voltage such that said current flow changes as a direct result of changing gas density thereabout, said means for producing heat being an integrated circuit device,
    a non-flexing means for holding said means for producing heat, said non-flexing means being an electrical insulator and a thermal barrier, said non-flexing means being mounted on a housing, and
    electrical contacts, said electrical contacts attached to said means for producing heat.

2. A method of measuring gas pressure, said method comprising the steps of:
    applying a fixed voltage to a heat producing means that has gas thereabout,
    allowing said heat producing means to reach thermodynamic equilibrium;

measuring a current from said heat producing means when said equilibrium is reached, the current being indicative of a gas pressure of the gas thereabout;

measuring the temperature of an ambient gas about said heat producing means while in equilibrium, said temperature being independent of said heat producing means; and correcting the gas pressure measured by said heat producing means for the temperature of said ambient gas.

* * * * *